United States Patent
Kado

(10) Patent No.: US 11,074,689 B2
(45) Date of Patent: Jul. 27, 2021

(54) MEDICAL IMAGE PROCESSING DEVICE AND MEDICAL OBSERVATION SYSTEM

(71) Applicant: Sony Olympus Medical Solutions Inc., Tokyo (JP)

(72) Inventor: Masataka Kado, Kanagawa (JP)

(73) Assignee: SONY OLYMPUS MEDICAL SOLUTIONS INC., Tokyo (JP)

(*) Notice: Subject to any disclaimer, the term of this patent is extended or adjusted under 35 U.S.C. 154(b) by 20 days.

(21) Appl. No.: 16/740,486

(22) Filed: Jan. 13, 2020

(65) Prior Publication Data
US 2020/0302598 A1    Sep. 24, 2020

(30) Foreign Application Priority Data
Mar. 20, 2019  (JP) .............................. JP2019-053835

(51) Int. Cl.
| | | |
|---|---|---|
| G06T 7/00 | (2017.01) |
| G06T 7/507 | (2017.01) |
| G06T 15/80 | (2011.01) |
| G06T 15/30 | (2011.01) |
| G06T 15/60 | (2006.01) |

(52) U.S. Cl.
CPC ............ *G06T 7/0012* (2013.01); *G06T 7/507* (2017.01); *G06T 15/30* (2013.01); *G06T 15/60* (2013.01); *G06T 15/80* (2013.01); *G06T 2207/10072* (2013.01)

(58) Field of Classification Search
None
See application file for complete search history.

(56) References Cited

U.S. PATENT DOCUMENTS

| | | | | |
|---|---|---|---|---|
| 7,640,050 B2* | 12/2009 | Glenn, Jr. | ............... | A61B 6/481 600/407 |
| 7,652,259 B2* | 1/2010 | Kimchy | ................... | A61B 1/05 250/370.08 |
| 8,253,778 B2* | 8/2012 | Atsushi | .................. | A61C 1/084 348/42 |
| 9,536,345 B2* | 1/2017 | Krig | ........................ | G06T 19/20 |
| 9,743,896 B2* | 8/2017 | Averbuch | ................. | A61B 6/12 |
| 10,068,671 B2* | 9/2018 | Dean | ....................... | G06T 7/001 |
| 2006/0237652 A1* | 10/2006 | Kimchy | .................... | G06T 5/50 250/363.02 |

(Continued)

FOREIGN PATENT DOCUMENTS

JP    07-508449 A    9/1995

*Primary Examiner* — Anand P Bhatnagar
(74) *Attorney, Agent, or Firm* — Xsensus, LLP

(57) ABSTRACT

A medical image processing device includes a processor including hardware. The processor is configured to: acquire a real image acquired by imaging of an observation target; execute cut-out processing of generating a cut-out image by cutting out at least a part of a three-dimensional image that is based on plural tomographic images having the observation target captured therein; execute shade and shadow processing of adding shade or a shadow to the cut-out image, based on illumination condition information indicating an illumination condition for the observation target in the imaging of the real image; and execute superimposition processing of generating a superimposed image by superimposing the cut-out image that has been subjected to the shade and shadow processing, on the real image.

7 Claims, 6 Drawing Sheets

(56) References Cited

U.S. PATENT DOCUMENTS

| | | | |
|---|---|---|---|
| 2007/0263915 A1* | 11/2007 | Mashiach | G06K 9/4638 |
| | | | 382/130 |
| 2010/0238201 A1* | 9/2010 | Nonaka | G09G 3/3611 |
| | | | 345/690 |
| 2011/0102549 A1* | 5/2011 | Takahashi | A61C 1/084 |
| | | | 348/46 |
| 2014/0176535 A1* | 6/2014 | Krig | G06T 19/20 |
| | | | 345/419 |
| 2017/0046833 A1* | 2/2017 | Lurie | G06T 5/008 |
| 2020/0043186 A1* | 2/2020 | Selviah | G06K 9/6203 |
| 2021/0030510 A1* | 2/2021 | Neishi | A61B 90/361 |

* cited by examiner

MEDICAL IMAGE PROCESSING DEVICE AND MEDICAL OBSERVATION SYSTEM

This application claims priority from Japanese Application No. 2019-053835, filed on Mar. 20, 2019, the contents of which are incorporated by reference herein in its entirety.

BACKGROUND

The present disclosure is related to a medical image processing device and a medical observation system.

In the related art, known is a medical observation system that generates a superimposed image by superimposing a three-dimensional image based on plural tomographic images captured by a tomographic device for computed tomography (CT) or magnetic resonance imaging (MRI), on a real image acquired through imaging of an observation target by means of an imaging device (as seen in, for example, Japanese Unexamined Patent Application Publication (Translation of PCT Application) No. H07-508449.

In the medical observation system described in Japanese Unexamined Patent Application Publication (Translation of PCT Application) No. H07-508449, an image corresponding to a position and an orientation of the imaging device relative to the observation target is cut out from the three-dimensional image, and the superimposed image is generated by superimposition of the cut-out image on the real image.

SUMMARY

However, in the medical observation system described in Japanese Unexamined Patent Application Publication (Translation of PCT Application) No. H07-508449, the real image and the three-dimensional image are superimposed on each other with only their positions and orientations matching each other, and these two images thus do not match each other in their depth direction. That is, there is a problem that a superimposed image suitable for observation is unable to be generated.

According to one aspect of the present disclosure, there is provided a medical image processing device including a processor including hardware, the processor being configured to: acquire a real image acquired by imaging of an observation target; execute cut-out processing of generating a cut-out image by cutting out at least a part of a three-dimensional image that is based on plural tomographic images having the observation target captured therein; execute shade and shadow processing of adding shade or a shadow to the cut-out image, based on illumination condition information indicating an illumination condition for the observation target in the imaging of the real image; and execute superimposition processing of generating a superimposed image by superimposing the cut-out image that has been subjected to the shade and shadow processing, on the real image.

DETAILED DESCRIPTION

Described hereinafter by reference to the drawings is a mode (hereinafter, the embodiment) for implementation of the present disclosure. The present disclosure is not limited by the embodiment described below. Furthermore, the same portions will be assigned with the same reference signs, throughout the drawings.

Schematic Configuration of Medical Observation System

Figure 1:
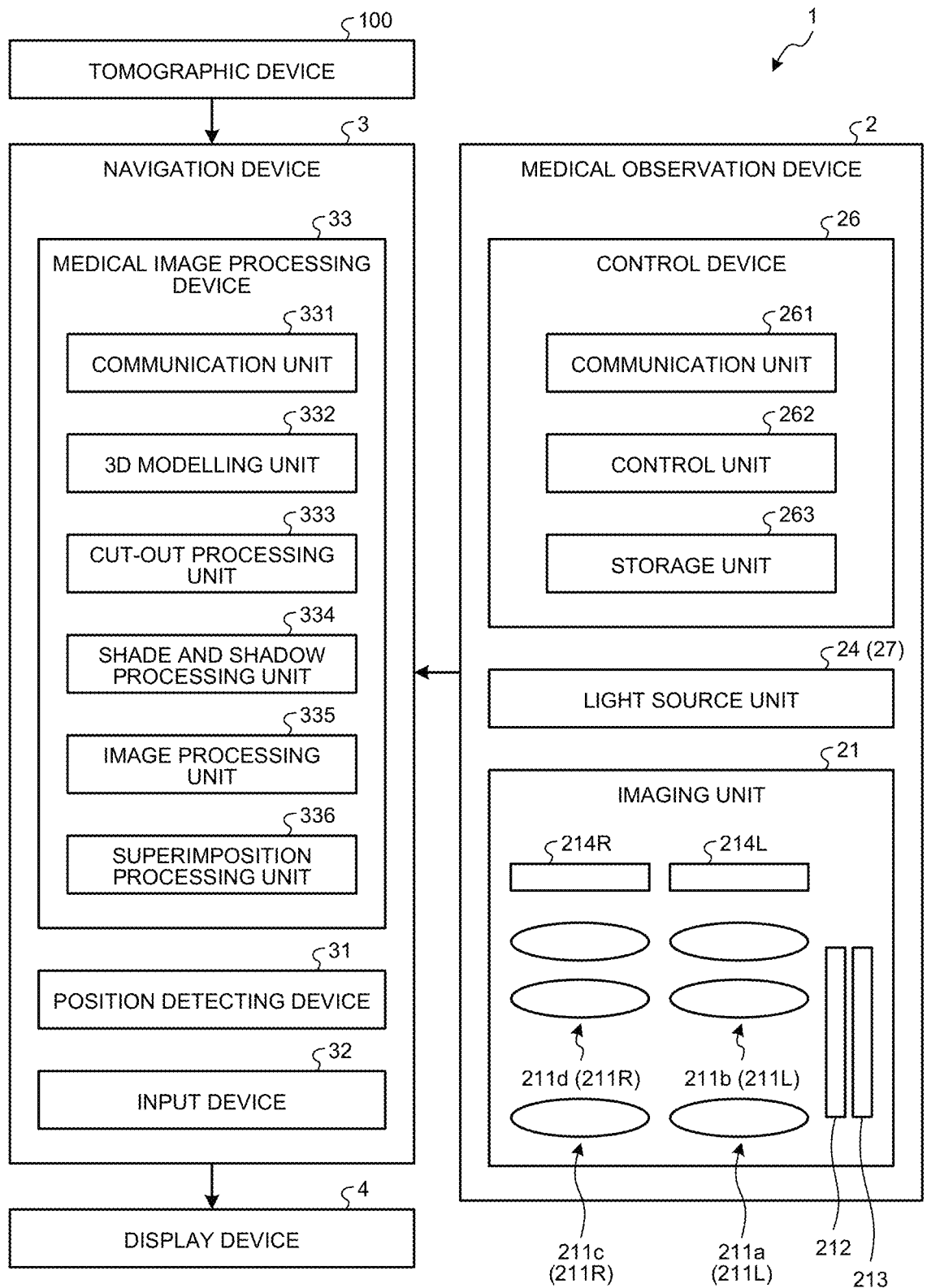
FIG. 1 is a block diagram illustrating a medical observation system according to an embodiment.

FIG. 1 is a block diagram illustrating a medical observation system 1 according to an embodiment.

The medical observation system 1 is a system that displays a superimposed image having a three-dimensional image (hereinafter, referred to as the computer graphics (CG) image) superimposed on a real image having an observation target captured therein, the three-dimensional image being based on plural tomographic images captured by a tomographic device 100 (FIG. 1) for CT or MRI, for, for example: supporting microsurgery, such as a neurosurgical procedure; or performing endoscopic surgery. This medical observation system 1 includes, as illustrated in FIG. 1, a medical observation device 2, a navigation device 3, and a display device 4 that is formed of a display having liquid crystal or organic electroluminescence (EL) used therein.

According to the embodiment, the display device 4 is formed of an active 3D display or a passive 3D display.

Configuration of Medical Observation Device

Figure 2:
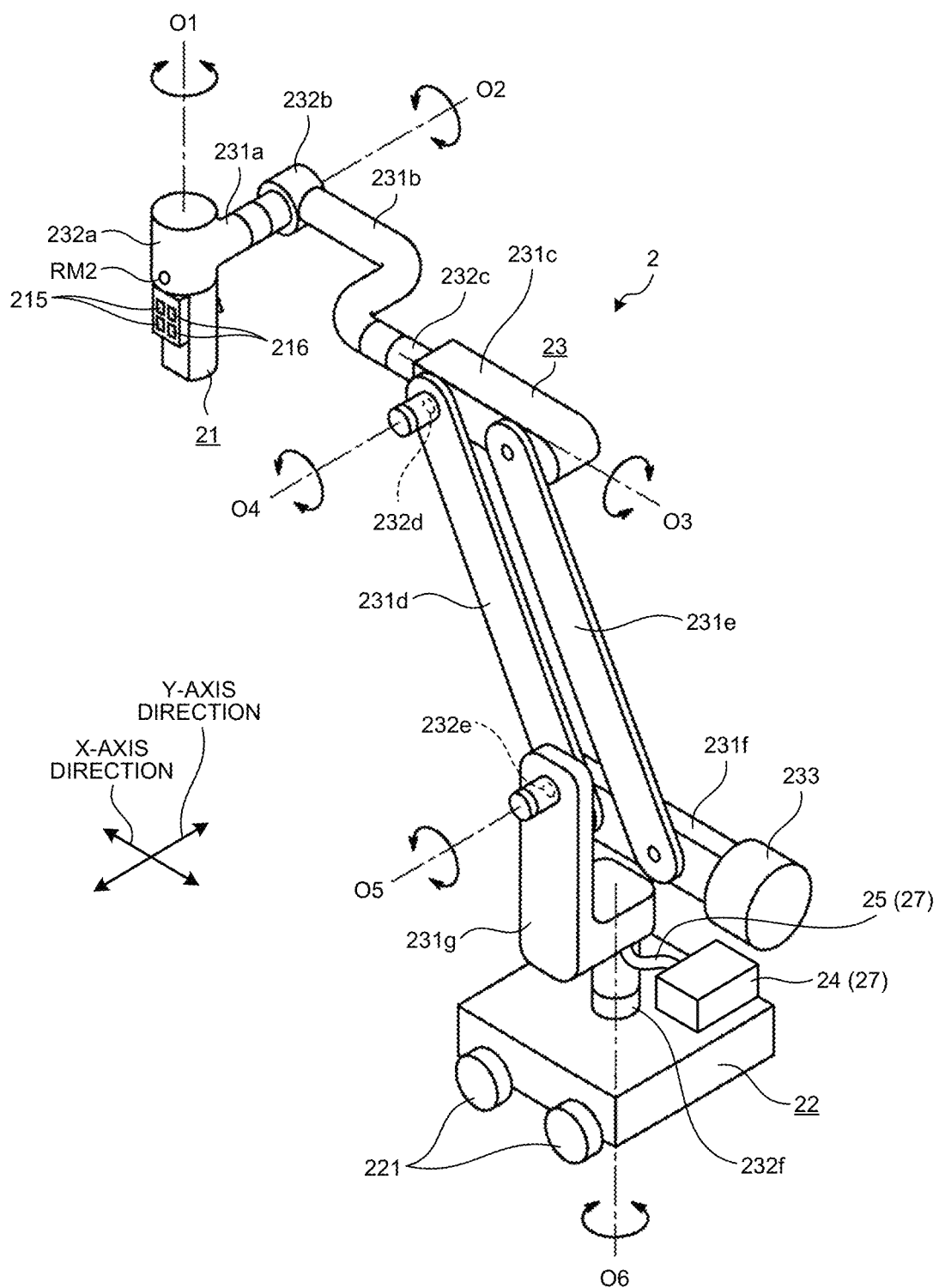
FIG. 2 is a diagram illustrating a medical observation device.

FIG. 2 is a diagram illustrating the medical observation device 2.

The medical observation device 2 is a device that generates a real image by imaging an observation target.

This medical observation device 2 includes, as illustrated in FIG. 1 or FIG. 2, an imaging unit 21, a base unit 22 (FIG. 2), a supporting unit 23 (FIG. 2), a light source unit 24, a light guide 25 (FIG. 2), and a control device 26 (FIG. 1).

The imaging unit 21 corresponds to an imaging device according to the present disclosure. According to the embodiment, the imaging unit 21 includes, as illustrated in FIG. 1, a left-eye observation optical system 211L, a right-eye observation optical system 211R, a driving unit 212, a lens position detecting unit 213, a left-eye imaging element 214L, and a right-eye imaging element 214R, and is formed as a so-called stereo camera.

The left-eye observation optical system 211L captures a subject image (hereinafter, referred to as the left-eye subject image) from the observation target, and forms the subject image on an imaging surface of the left-eye imaging element 214L. This left-eye observation optical system 211L includes, as illustrated in FIG. 1, a focusing optical system 211a and a zooming optical system 211b.

The focusing optical system 211a is formed by use of one or plural lenses, and adjusts focus by moving along an optical axis.

The zooming optical system 211b is formed by use of one or plural lenses, and adjusts angle of view by moving along the optical axis.

The right-eye observation optical system 211R captures a subject image (hereinafter, referred to as the right-eye subject image) from the observation target, and forms the subject image on an imaging surface of the right-eye imaging element 214R. This right-eye observation optical system 211R includes, as illustrated in FIG. 1, a focusing optical system 211c and a zooming optical system 211d, which are similar to the focusing optical system 211a and the zooming optical system 211b that form the left-eye observation optical system 211L.

Furthermore, the imaging unit 21 is provided with a focusing mechanism (not illustrated in the drawings) that moves the focusing optical systems 211a and 211c along their optical axes, and an optical zooming mechanism (not illustrated in the drawings) that moves the zooming optical systems 211b and 211d along their optical axes.

Figure 3:
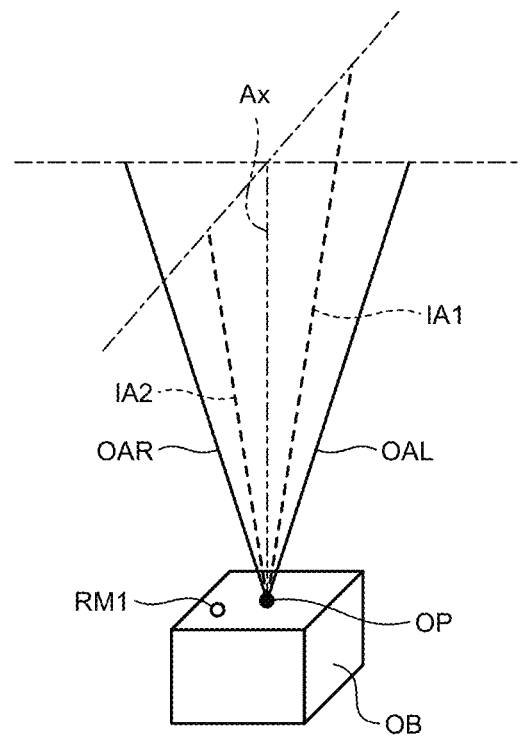
FIG. 3 is a diagram for explanation of left-eye and right-eye observation optical axes and illumination optical axes.
Figure 4:
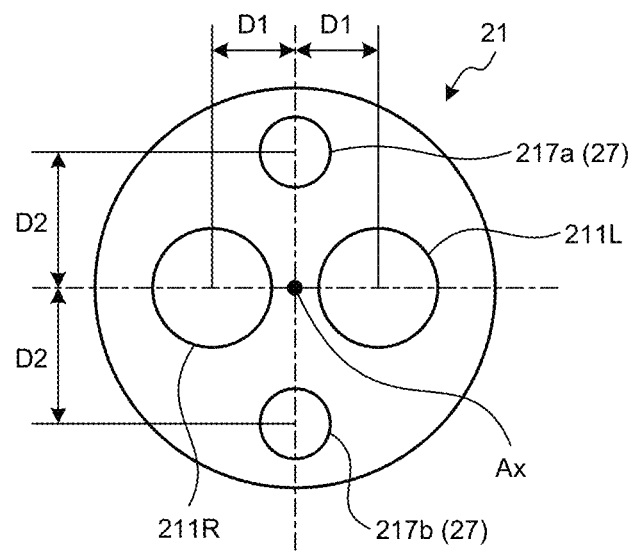
FIG. 4 is a diagram for explanation of the left-eye and right-eye observation optical axes and the illumination optical axes.

FIG. 3 and FIG. 4 are diagrams for explanation of left-eye and right-eye observation optical axes OAL and OAR and illumination optical axes IA1 and IA2. Specifically, FIG. 3 is a diagram schematically illustrating: an optical axis (the left-eye observation optical axis OAL) of the left-eye subject image directed to the left-eye observation optical system 211L from an imaging position OP on an observation target OB; an optical axis (the right-eye observation optical axis OAR) of the right-eye subject image directed to the right-eye observation optical system 211R from the imaging position OP; and the illumination optical axes IA1 and IA2 directed to the imaging position OP. The left-eye and right-eye observation optical axes OAL and OAR correspond to observation optical axes according to the present disclosure. FIG. 4 is a diagram illustrating the imaging unit 21 as viewed from a lower side in FIG. 2.

As illustrated in FIG. 4, the left-eye and right-eye observation optical systems 211L and 211R are provided at rotationally symmetric positions of 180 degrees about a central axis Ax of the imaging unit 21. The optical axis (the left-eye observation optical axis OAL) of the left-eye subject image directed to the left-eye observation optical system 211L from the imaging position OP on the observation target OB and the optical axis (the right-eye observation optical axis OAR) of the right-eye subject image directed to the right-eye observation optical system 211R from the imaging position OP intersect each other at a predetermined angle, as illustrated in FIG. 3. That is, the left-eye subject image at the imaging position OP captured by the left-eye observation optical system 211L and the right-eye subject image at the imaging position OP captured by the right-eye observation optical system 211R are subject images having the imaging position OP on the observation target OB, the imaging position OP having been viewed therein from different angles.

The observation target OB has, attached thereto, a first reference marker RM1 that is detected by the navigation device 3, as illustrated in FIG. 3. According to the embodiment, the first reference marker RM1 is formed of a reflective marker that reflects infrared light. In FIG. 3, only one first reference marker RM1 is illustrated for convenience of explanation, but more than one first reference marker RM1 is actually provided thereon. Furthermore, the first reference marker RM1 is not necessarily the reflective marker that reflects infrared light, and may be configured as a device fixed to the observation target OB, the device including a light emitting diode (LED) that emits infrared light.

The tomographic device 100 captures images of the observation target OB, to which the first reference marker RM1 has been attached. Similarly, the medical observation device 2 captures images of the observation target OB, to which the first reference marker RM1 has been attached.

According to operation by an operator, such as a practitioner, on a focusing switch 215 (FIG. 2) provided in the imaging unit 21, the driving unit 212 adjusts focus of the left-eye and right-eye observation optical systems 211L and 211R by causing the above described focusing mechanism to operate, under control by the control device 26. Furthermore, according to operation by the operator on a zooming switch 216 (FIG. 2) provided in the imaging unit 21, the driving unit 212 adjusts angles of view of the left-eye and right-eye observation optical systems 211L and 211R by causing the above described optical zooming mechanism to operate, under control by the control device 26.

The lens position detecting unit 213 is formed of a position sensor, such as a photointerrupter, and detects lens positions (hereinafter, referred to as the focusing positions) of the focusing optical systems 211a and 211c, and lens positions (hereinafter, referred to as the zooming positions) of the zooming optical systems 211b and 211d. The lens position detecting unit 213 then outputs a signal according to the focusing positions and zooming positions detected, to the control device 26.

The left-eye imaging element 214L is formed of a charge coupled device (CCD) sensor or a complementary metal oxide semiconductor (CMOS) sensor, which receives the left-eye subject image formed by the left-eye observation optical system 211L and converts the left-eye subject image into an electric signal.

The right-eye imaging element 214R is formed of a CCD sensor or a CMOS sensor, which receives the right-eye subject image formed by the right-eye observation optical system 211R and converts the right-eye subject image into an electric signal.

Hereinafter, for convenience of explanation, an image generated by the left-eye subject image being captured by the left-eye imaging element 214L will be referred to as the left-eye image. Furthermore, an image generated by the right-eye subject image being captured by the right-eye imaging element 214R will be referred to as the right-eye image. The left-eye image and the right-eye image correspond to real images according to the present disclosure. These real images are output to the control device 26.

Furthermore, as illustrated in FIG. 2, an outer surface of the imaging unit 21 is provided with a second reference marker RM2 detected by the navigation device 3. According to the embodiment, the second reference marker RM2 is formed of a reflective marker that reflects infrared light. In FIG. 2, only one second reference marker RM2 is illustrated for convenience of explanation, but more than one second reference marker RM2 is actually provided thereon. Moreover, the second reference marker RM2 is not necessarily the reflective marker that reflects infrared light, and may be formed of an LED that emits infrared light.

The base unit 22 is a base of the medical observation device 2, and is formed to be movable on a floor surface via casters 221 (FIG. 2).

The supporting unit 23 extends from the base unit 22, and holds the imaging unit 21 at a distal end thereof (an end thereof separated from the base unit 22). The supporting unit 23 allows the imaging unit 21 to move three-dimensionally, according to external force applied from the operator.

According to the embodiment, the supporting unit 23 is configured to have six degrees of freedom for movement of the imaging unit 21, but without being limited to this configuration, the supporting unit 23 may be configured to have any other number of degrees of freedom.

This supporting unit 23 includes, as illustrated in FIG. 2, first to seventh arm portions 231a to 231g and first to sixth joint portions 232a to 232f.

The first joint portion 232a is positioned at a distal end of the supporting unit 23. This first joint portion 232a is fixedly supported by the first arm portion 231a and holds the imaging unit 21 rotatably about a first axis O1 (FIG. 2).

The first axis O1 coincides with the central axis Ax of the imaging unit 21. That is, when the imaging unit 21 is rotated around the first axis O1, direction of the imaging field of the imaging unit 21 is changed.

The first arm portion 231a is a substantially rod-shaped member that extends in a direction orthogonal to the first axis O1 and fixedly supports the first joint portion 232a at a distal end of the first arm portion 231a.

The second joint portion 232b is fixedly supported by the second arm portion 231b and holds the first arm portion 231a rotatably about a second axis O2 (FIG. 2). The second joint portion 232b thus allows the imaging unit 21 to rotate around the second axis O2.

The second axis O2 is orthogonal to the first axis O1 and parallel to the direction, in which the first arm portion 231a extends. That is, when the imaging unit 21 is rotated around the second axis O2, direction of the central axis Ax of the imaging unit 21 relative to the observation target OB is changed. In other words, the imaging field of the imaging unit 21 moves along an X axis (FIG. 2) orthogonal to the first and second axes O1 and O2, in a horizontal plane. The second joint portion 232b is thus a joint portion for moving the imaging field of the imaging unit 21 along the X-axis.

The second arm portion 231b has a crank shape extending in a direction orthogonal to the first and second axes O1 and O2 and fixedly supports the second joint portion 232b at a distal end of the second arm portion 231b.

The third joint portion 232c is fixedly supported by the third arm portion 231c and holds the second arm portion 231b rotatably about a third axis O3 (FIG. 2). The third joint portion 232c thus allows the imaging unit 21 to rotate around the third axis O3.

The third axis O3 is orthogonal to the first and second axes O1 and O2. That is, when the imaging unit 21 is rotated around the third axis O3, the direction of the central axis Ax of the imaging unit 21 relative to the observation target OB is changed. In other words, the imaging field of the imaging unit 21 moves along a Y-axis (FIG. 2) orthogonal to the X-axis in a horizontal plane. The third joint portion 232c is thus a joint portion for moving the imaging field of the imaging unit 21 along the Y-axis.

The third arm portion 231c is a substantially rod-shaped member that extends in a direction substantially parallel to the third axis O3, and the third arm portion 231c fixedly supports the third joint portion 232c at a distal end of the third arm portion 231c.

The fourth joint portion 232d is fixedly supported by the fourth arm portion 231d and holds the third arm portion 231c rotatably about a fourth axis O4 (FIG. 2). The fourth joint portion 232d thus allows the imaging unit 21 to rotate around the fourth axis O4.

The fourth axis O4 is orthogonal to the third axis O3. That is, when the imaging unit 21 is rotated around the fourth axis O4, height of the imaging unit 21 is adjusted. The fourth joint portion 232d is thus a joint portion for moving the imaging unit 21 parallelly.

The fourth arm portion 231d is a substantially bar-shaped member orthogonal to the fourth axis O4 and extending linearly toward the base unit 22 and fixedly supports the fourth joint portion 232d at one end of the fourth arm portion 231d.

The fifth arm portion 231e has the same shape as the fourth arm portion 231d. One end of the fifth arm portion 231e is connected to the third arm portion 231c, such that the fifth arm portion 231e is rotatable about an axis parallel to the fourth axis O4.

The sixth arm portion 231f has substantially the same shape as the third arm portion 231c. The sixth arm portion 231f is connected rotatably about an axis parallel to the fourth axis O4, to the other ends of the fourth and fifth arm portions 231d and 231e, in a posture where the sixth arm portion 231f forms a parallelogram with the third to fifth arm portions 231c to 231e. Furthermore, an end of the sixth arm portion 231f is provided with a counterweight 233 (see FIG. 3).

Mass and placement position of the counterweight 233 are adjusted, such that rotational moment generated around the fourth axis O4 and rotational moment generated around the fifth axis O5 (FIG. 2) are able to be countered by mass of the components provided more toward the distal end of the supporting unit 23 (toward the end where the imaging unit 21 is provided) than the counterweight 233 is. That is, the supporting unit 23 is a balance arm (a configuration provided with the counterweight 233). The supporting unit 23 may have a configuration without the counterweight 233.

The fifth joint portion 232e is fixedly supported by the seventh arm portion 231g and holds the fourth arm portion 231d rotatably about the fifth axis O5. The fifth joint portion 232e thus allows the imaging unit 21 to rotate around the fifth axis O5.

The fifth axis O5 is parallel to the fourth axis O4. That is, when the imaging unit 21 is rotated around the fifth axis O5, the height of the imaging unit 21 is adjusted. The fifth joint portion 232e is thus a joint portion for moving the imaging unit 21 parallelly.

The seventh arm portion 231g has a substantially L-shape formed of a first part extending in a vertical direction and a second part bent from the first part and extending at substantially right angles to the first part, and fixedly supports the fifth joint portion 232e in the first part.

The sixth joint portion 232f is fixedly supported by the base unit 22 and holds the second part of the seventh arm portion 231g rotatably about a sixth axis O6 (FIG. 2). The sixth joint portion 232f thus allows the imaging unit 21 to rotate around the sixth axis O6.

The sixth axis O6 is an axis along the vertical direction. That is, the sixth joint portion 232f is thus a joint portion for moving the imaging unit 21 parallelly.

The first axis O1 described above is formed of a passive axis that allows the imaging unit 21 to rotate around the first axis O1 passively according to external force applied from the operator, regardless of motive power of an actuator. The second to sixth axes O2 to O6 are each similarly formed of a passive axis.

The light source unit 24 has one end of the light guide 25 connected thereto, and supplies illumination light of a quantity specified by the control device 26 to that end of the light guide 25.

The light guide 25 has that one end connected to the light source unit 24, and the other end branched into two and connected to the imaging unit 21. The light guide 25 supplies the light supplied from the light source unit 24 to the imaging unit 21 by transmitting the light from that one end to the other end. Furthermore, the imaging unit 21 has, arranged therein, illumination lenses 217a and 217b (FIG. 4) opposite to the two branched ends at the other end of the light guide 25 respectively.

As illustrated in FIG. 4, illumination lenses 217a and 217b are provided at rotationally symmetric positions of 180 degrees about the central axis Ax of the imaging unit 21. Furthermore, the illumination lenses 217a and 217b are respectively provided at positions rotated by 90 degrees about the central axis Ax of the imaging unit 21 relatively to the left-eye and right-eye observation optical systems. The optical axis of illumination light (the illumination optical axis IA1) emitted from one of the two branched ends at the other end of the light guide 25 and heading to the imaging position OP via the illumination lens 217a and the optical axis of illumination light (the illumination optical axis IA2) emitted from the other one of the two branched ends at the other end of the light guide 25 and heading to the imaging position OP via the illumination lens 217b intersect each other at predetermined angles, as illustrated in FIG. 3.

The light source unit 24, the light guide 25, and the illumination lenses 217a and 217b described above correspond to an illumination device 27 (FIG. 1 and FIG. 2) according to the present disclosure.

The control device 26 is provided inside the base unit 22. This control device 26 includes, as illustrated in FIG. 1, a communication unit 261, a control unit 262, and a storage unit 263.

The communication unit 261 is an interface that performs communication of various types of data with the navigation device 3 according to a predetermined protocol. The communication between the medical observation device 2 and the navigation device 3 may be wireless communication or wired communication.

The control unit 262 is formed of a central processing unit (CPU) or a field programmable gate array (FPGA), and centrally controls operation of the medical observation device 2 according to a control program stored in the storage unit 263.

Specifically, the control unit 262 transmits, via the communication unit 261, (1) left-eye and right-eye images (real images), (2) a focal distance in the imaging unit 21, (3) an angle of view in the imaging unit 21, (4) a first clearance D1, (5) a second clearance D2, (6) light distribution characteristics in the illumination device 27, and (7) a light quantity, to the navigation device 3.

The above mentioned (1) left-eye and right-eye images (real images) are images respectively generated by the left-eye and right-eye imaging elements 214L and 214R.

The above mentioned (2) focal distance in the imaging unit 21 is a focal distance calculated by the control unit 262, based on a focusing position detected by the lens position detecting unit 213 at the time of imaging of the real image.

The above mentioned (3) angle of view in the imaging unit 21 is an angle of view calculated by the control unit 262, based on a zooming position detected by the lens position detecting unit 213 at the time of imaging of the real image.

The above mentioned (4) first clearance D1 is a clearance from the central axis Ax of the imaging unit 21 to a central position of the left-eye or right-eye observation optical system 211L or 211R (FIG. 4). The first clearance D1 has been stored as design data in the storage unit 263 beforehand.

The above described pieces of information (2) to (4) form imaging condition information according to the present disclosure.

The above mentioned (5) second clearance D2 is a clearance from the central axis Ax of the imaging unit 21 to a central position of the illumination lens 217a or 217b (FIG. 4). The second clearance D2 has been stored as design data in the storage unit 263 beforehand.

The above mentioned (6) light distribution characteristics in the illumination device 27 have been stored as design data in the storage unit 263 beforehand.

The above mentioned (7) light quantity is a light quantity specified by the control unit 262 for the light source unit 24.

The above described pieces of information (5) to (7) form illumination condition information according to the present disclosure.

The storage unit 263 stores therein a control program executed by the control unit 262 and the above described pieces of information (4) to (6).

Configuration of Navigation Device

The navigation device 3 includes, as illustrated in FIG. 1, a position detecting device 31, an input device 32, and a medical image processing device 33.

The position detecting device 31 includes an infrared camera and detects the first reference marker RM1 attached to the observation target OB and a second reference marker RM2 provided on the imaging unit 21.

More specifically, the position detecting device 31 measures a position of the first reference marker RM1 by use of the principle of triangulation, and sets, from the position of the first reference marker RM1, a specific coordinate system (hereinafter, referred to as the reference coordinate system) having a specific reference point as the origin. Furthermore, the position detecting device 31 measures a position of the second reference marker RM2 by use of the principle of triangulation, and calculates (8) a position of the imaging unit 21, (9) a rotational position about the central axis Ax in the imaging unit 21, and (10) an inclination of the central axis Ax of the imaging unit 21, in the reference coordinate system. The position detecting device 31 then transmits the above mentioned pieces of information (8) to (10), to the medical image processing device 33.

The above described pieces of information (8) to (10) form the imaging condition information according to the present disclosure. Furthermore, according to the embodiment, the illumination device 27 is provided in the imaging unit 21, and the above described piece of information (8) thus correspond also to a position of the illumination device 27. The above described pieces of information (8) to (10) form the illumination condition information according to the present disclosure.

The position detection by the position detecting device 31 is not limited to position detection by use of infrared light, and optical position detection by use of light other than infrared light may be adopted instead, or magnetic field type position detection by use of a magnetic field or position detection of another type may be adopted instead.

The input device 32 is formed by use of an operating device, such as a mouse, a keyboard, and/or a touch panel, and receives a user operation from an operator. The input device 32 transmits an operation signal according to the user operation, to the medical image processing device 33.

The medical image processing device 33 generates a superimposed image by superimposing a CG image based on plural tomographic images captured by the tomographic device 100, on a real image captured by the medical observation device 2. This medical image processing device 33 includes, as illustrated in FIG. 1, a communication unit 331, a 3D modelling unit 332, a cut-out processing unit 333, a shade and shadow processing unit 334, an image processing unit 335, and a superimposition processing unit 336.

The communication unit 331 is an interface that performs communication of various types of data with the tomographic device 100, the medical observation device 2 (the communication unit 261), and the position detecting device 31, according to a predetermined protocol. The communication between the medical image processing device 33 and the tomographic device 100, medical observation device 2, and position detecting device 31 may be wireless communication or wired communication.

The communication unit 331 receives plural tomographic images captured by the tomographic device 100 from the tomographic device 100, receives the above described pieces of information (1) to (7) from the medical observation device 2 (the communication unit 261), and receives the above described pieces of information (8) to (10) from the position detecting device 31. That is, the communication unit 331 corresponds to an image acquiring unit according to the present disclosure.

The 3D modelling unit 332 generates a CG image by using a known technique (for example, volume rendering), from the plural tomographic images received by the communication unit 331.

The cut-out processing unit 333 executes cut-out processing of generating a cut-out image by cutting out at least a part of the CG image. According to the embodiment, through the cut-put processing, the cut-out processing unit 333 cuts out a left-eye cut-out image corresponding to a left-eye image from the CG image, and cuts out a right-eye cut-out image corresponding to a right-eye image from the CG image.

Specifically, the cut-out processing unit 333 determines a reference coordinate system in the CG image, from the position of the first reference marker RM1 included in the CG image. The reference coordinate system is the same coordinate system as the reference coordinate system that has been set by the position detecting device 31.

Furthermore, the cut-out processing unit 333 determines (11) an inclination of the left-eye observation optical axis OAL in the reference coordinate system, based on the above described (4) first clearance D1, the above described (8) position of the imaging unit 21, the above described (9) rotational position about the central axis Ax in the imaging unit 21, and the above described (10) inclination of the central axis Ax of the imaging unit 21. Moreover, the cut-out processing unit 333 determines which position was viewed from which direction in the left-eye image in the reference coordinate system and in what size in the reference coordinate system the left-eye image was captured, based on the above described focal distance in the imaging unit 21, the above described (3) angle of view in the imaging unit 21, the above described (4) first clearance D1, the above described (8) position of the imaging unit 21, the above described (9) rotational position about the central axis Ax in the imaging unit 21, and the above described (11) inclination of the left-eye observation optical axis OAL. That is, the cut-out processing unit 333 recognizes that the left-eye image is an image acquired by imaging of the imaging position OP in a first size in the reference coordinate system, the imaging position OP having been viewed from a first direction. The cut-out processing unit 333 then generates a left-eye cut-out image by cutting out a portion (for example, a nerve or a tumor) from a CG image, in the first size as viewed from the first direction, the portion being more separate from the position of the imaging unit 21 than the imaging position OP is in the reference coordinate system.

The above described piece of information (11) forms the imaging condition information according to the present disclosure.

Similarly, the cut-out processing unit 333 determines (12) an inclination of the right-eye observation optical axis OAR in the reference coordinate system, based on the above described (4) first clearance D1, the above described (8) position of the imaging unit 21, the above described (9) rotational position about the central axis Ax in the imaging unit 21, and the above described (10) inclination of the central axis Ax of the imaging unit 21. Furthermore, the cut-out processing unit 333 determines which position was viewed from which direction in the right-eye image in the reference coordinate system and in what size in the reference coordinate system the right-eye image was captured, based on the above described (2) focal distance in the imaging unit 21, the above described (3) angle of view in the imaging unit 21, the above described (4) first clearance D1, the above described (8) position of the imaging unit 21, the above described (9) rotational position about the central axis Ax in the imaging unit 21, and the above described (12) inclination of the right-eye observation optical axis OAR. That is, the cut-out processing unit 333 recognizes that the right-eye image is an image acquired by imaging of the imaging position OP in the first size in the reference coordinate system, the imaging position OP having been viewed from a second direction. The cut-out processing unit 333 then generates a right-eye cut-out image by cutting out a portion (for example, a nerve or a tumor) from the CG image in the first size as viewed from the second direction, the portion being more separate from the position of the imaging unit 21 than the imaging position OP is in the reference coordinate system.

The above described (12) piece of information forms the imaging condition information according to the present disclosure.

The shade and shadow processing unit 334 executes shade and shadow processing of adding shade and shadows in a cut-out image. According to this embodiment, the shade and shadow processing unit 334 adds shade and shadows in each of the left-eye and right-eye cut-out images. The shade and shadow processing is processing of adding shade and shadows in consideration of portions that undergo mirror reflection and portions that undergo diffuse reflection, based on the direction of illumination light emitted to the subject, and is also called shading processing, lighting processing, or shadowing processing.

Specifically, the shade and shadow processing unit 334 determines (13) inclinations of the illumination optical axes IA1 and IA2 in the reference coordinate system, based on the above described (5) second clearance D2, the above described (8) position of the imaging unit 21, the above described (9) rotational position about the central axis Ax in the imaging unit 21, and the above described (10) inclination of the central axis Ax of the imaging unit 21. Furthermore, the shade and shadow processing unit 334 determines from which direction illumination light was emitted to the imaging position OP in the reference coordinate system at the time of imaging of the left-eye and right-eye images, based on the above described (5) second clearance D2, the above described (8) position of the imaging unit 21, the above described (9) rotational position about the central axis Ax in the imaging unit 21, and the above described (13) inclinations of the illumination optical axes IA1 and IA2. That is, the shade and shadow processing unit 334 recognizes that illumination light was emitted from a third direction to the imaging position OP in the reference coordinate system at the time of imaging of the left-eye and right-eye images. The shade and shadow processing unit 334 adds, to the left-eye cut-out image, shade and shadows that are formed when the illumination light is emitted thereto from the third direction in the reference coordinate system. Similarly, the shade and shadow processing unit 334 adds, to the right-eye cut-out image, shade and shadows that are formed when the illumination light is emitted thereto from the third direction in the reference coordinate system. Moreover, in the shade and shadow processing, the shade and shadow processing unit 334 adjusts intensity of the shade and shadows added, based on the above described (6) light distribution characteristics in the illumination device 27 and the above described (7) light quantity.

The above described (13) piece of information forms the illumination condition information according to the present disclosure.

The image processing unit 335 executes image processing (hereinafter, referred to as color addition processing) of adding color and surface concavity and convexity to a subject image (for example, a nerve or a tumor) included in each of the left-eye and right-eye cut-out images that have been subjected to the shade and shadow processing.

The color and surface concavity and convexity added by the image processing unit 335 may be modified according to, for example, operation on the input device 32 by an operator.

The image processing unit 335 may add color to a subject image included in each of the left-eye and right-eye cut-out images that have been subjected to the shade and shadow processing, as described below.

For example, different colors are set beforehand for positions cut out through the cut-out processing in the reference coordinate system. The image processing unit 335 determines a color according to a position cut out through the cut-out processing, and adds the determined color.

Furthermore, for example, different colors are set beforehand according to intensities of shade and shadows added in the shade and shadow processing. The image processing unit 335 determines colors according to intensities of shade and shadows added through the shade and shadow processing and adds the determined colors.

The superimposition processing unit 336 executes superimposition processing of generating a superimposed image by superimposing a cut-out image that has been subjected to the shade and shadow processing, on a real image. According to the embodiment, the superimposition processing unit 336 generates a left-eye superimposed image by superimposing a left-eye cut-out image that has been subjected to the color addition processing, on a left-eye image, and generates a right-eye superimposed image by superimposing a right-eye cut-out image that has been subjected to the color addition processing, on a right-eye image.

The superimposition processing unit 336 then generates a three-dimensional image signal of, for example, the side-by-side type, from the left-eye and right-eye superimposed images generated, and outputs the three-dimensional image signal to the display device 4. The display device 4 thereby displays the left-eye and right-eye superimposed images based on the three-dimensional image signal, three-dimensionally.

Operation of Medical Image Processing Device

Described next is operation of the medical image processing device 33 described above.

Figure 5:
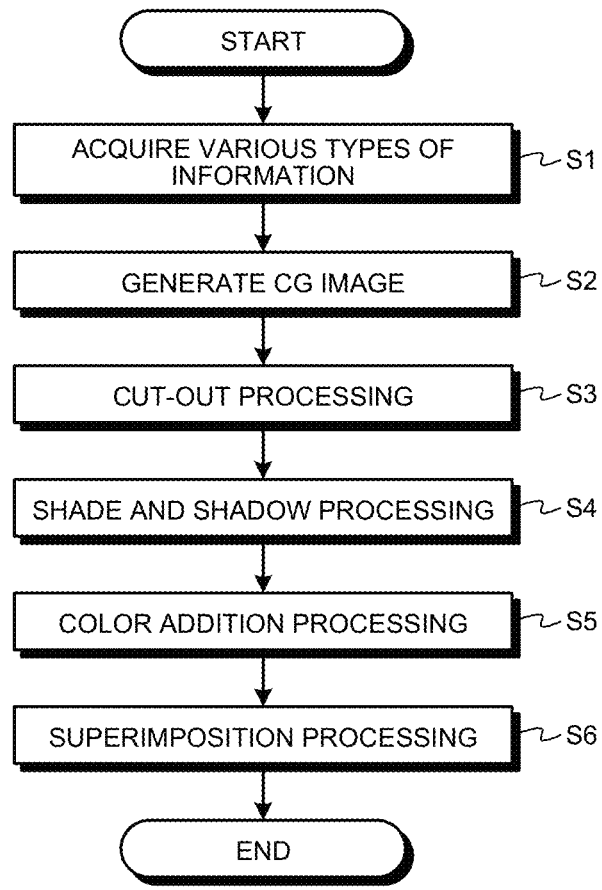
FIG. 5 is a flow chart illustrating operation of a medical image processing device.
Figure 6:
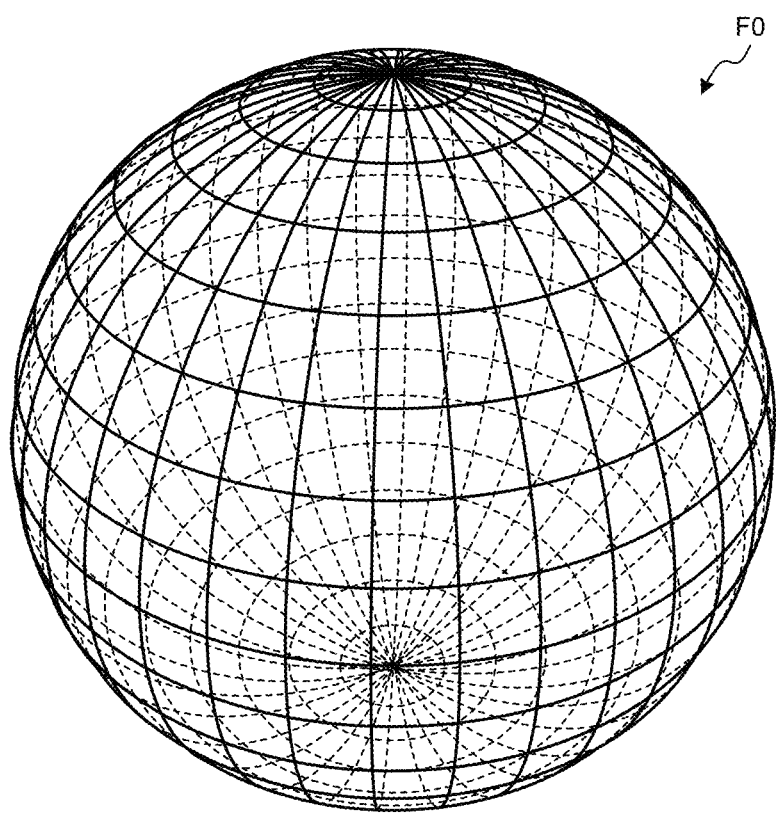
FIG. 6 is a diagram for explanation of the operation of the medical image processing device.
Figure 7:
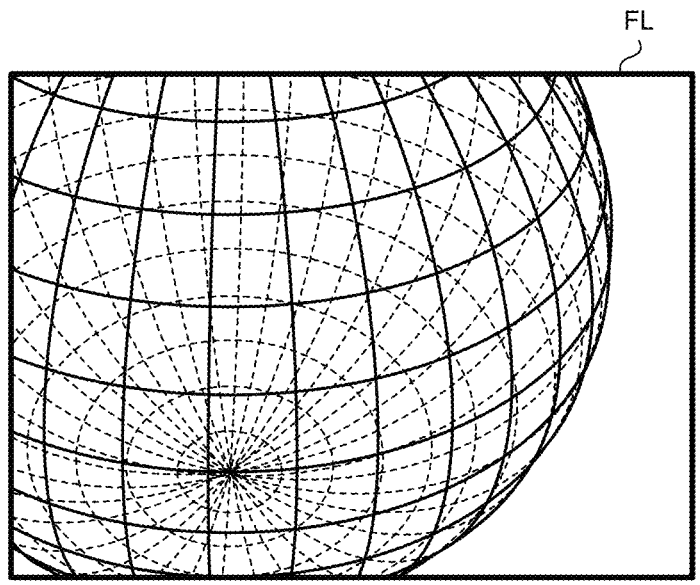
FIG. 7 is a diagram for explanation of the operation of the medical image processing device.
Figure 8:
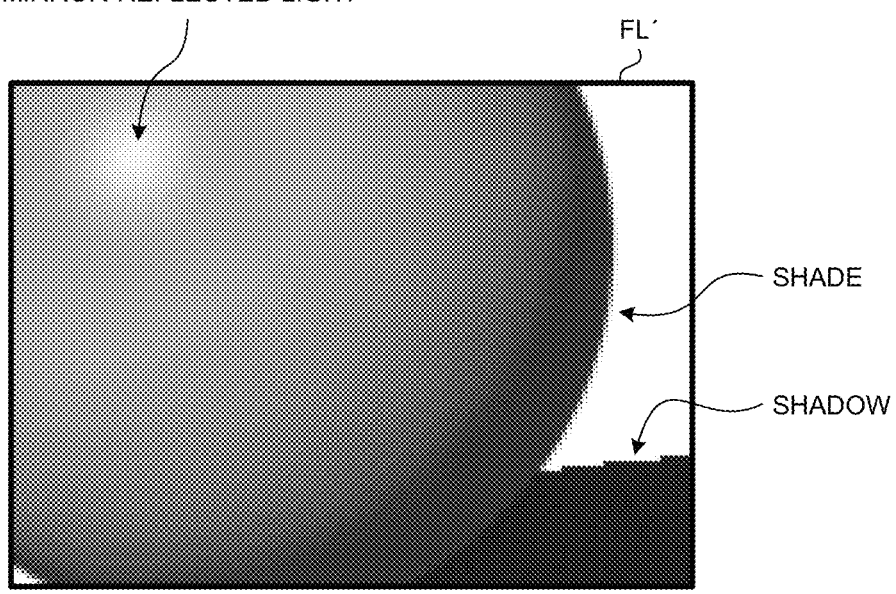
FIG. 8 is a diagram for explanation of the operation of the medical image processing device.

FIG. 5 is a flow chart illustrating the operation of the medical image processing device 33. FIG. 6 to FIG. 8 are diagrams for explanation of the operation of the medical image processing device 33.

Firstly, the medical image processing device 33 acquires various types of information (Step S1).

Specifically, at Step S1, the medical image processing device 33 receives plural tomographic images captured by the tomographic device 100 from the tomographic device 100 via the communication unit 331, receives the above described pieces of information (1) to (7) from the medical observation device 2, and receives the above described pieces of information (8) to (10) from the position detecting device 31.

After Step S1, the 3D modelling unit 332 generates a CG image F0 (FIG. 6) from the plural tomographic images acquired at Step S1 (Step S2). In FIG. 6, for convenience of explanation, the observation target OB is represented by a spherical body.

After Step S2, the cut-out processing unit 333 executes the cut-out processing and cuts out left-eye and right-eye cut-out images from the CG image F0 (Step S3). In FIG. 7, for convenience of explanation, only a left-eye cut-out image FL of the left-eye and right-eye cut-out images cut out through the cut-out processing are illustrated.

After Step S3, the shade and shadow processing unit 334 executes the shade and shadow processing and adds shade and shadows to the left-eye and right-eye cut-out images (Step S4). FIG. 8 illustrates a left-eye cut-out image FL' that has been subjected to the shade and shadow processing.

After Step S4, the image processing unit 335 executes the color addition processing and adds color and surface concavity and convexity to a subject image included in each of the left-eye and right-eye cut-out images that have been subjected to the shade and shadow processing (Step S5).

After Step S5, the superimposition processing unit 336 executes the superimposition processing and generates left-eye and right-eye superimposed images by respectively superimposing the left-eye and right-eye cut-out images that have been subjected to the color addition processing, on left-eye and right-eye images (Step S6). The superimposition processing unit 336 then generates a three-dimensional image signal from the left-eye and right-eye superimposed images generated and outputs the three-dimensional image signal to the display device 4. The display device 4 thereby displays the left-eye and right-eye superimposed images based on the three-dimensional image signal, three-dimensionally.

The above described embodiment achieves the following effects.

The medical image processing device 33 according to the embodiment generates a cut-out image by cutting out a part of a CG image, based on the imaging condition information indicating imaging conditions for the observation target OB in imaging of a real image. Furthermore, the medical image processing device 33 executes the shade and shadow processing of adding shade and shadows to the cut-out image, based on the illumination condition information indicating illumination conditions for the observation target OB in the imaging of the real image. The medical image processing device 33 generates a superimposed image by superimposing the cut-out image that has been subjected to the shade and shadow processing, on the real image.

The real image and the cut-out image thus match each other, not only in position, orientation, and size, but also in depth direction. Therefore, the medical image processing device 33 according to the embodiment enables generation of a superimposed image suitable for observation.

In particular, the illumination condition information is formed of the above described pieces of information (5) to (10) and (13).

Therefore, shade and shadows are able to be added to a cut-out image more appropriately and realistically, and a real image and the cut-out image are able to be made into images that match each other even more in the depth direction.

Furthermore, the medical image processing device 33 recognizes the imaging position OP by the imaging unit 21 on the observation target OB, based on the imaging condition information, and generates a cut-out image by cutting out a portion from a CG image, the portion being more separate from the imaging unit 21 than the imaging position OP is.

Therefore, a doctor is able to know, from a superimposed image, how deeply a portion of interest (a cut-out portion, for example, a nerve or a tumor) is present. Therefore, the superimposed image is able to be made into an image that is even more suitable for observation.

Other Embodiments

Thus far, an embodiment for implementation of the present disclosure has been described, but the present disclosure is not to be limited only to the above described embodiment.

According to the above described embodiment, the tomographic device 100 is a tomographic device for CT or MRI, but as long as the tomographic device 100 is able to generate plural tomographic images of an observation target OB, another tomographic device for positron emission tomography (PET), ultrasound tomography, resonance point laser microscope tomography, or electron microscope tomography may be adopted.

According to the above described embodiment, the medical image processing device 33 is included in the navigation device 3, but without being limited to the embodiment, the medical image processing device 33 may be configured as a device independent from the navigation device 3. Furthermore, the medical image processing device 33 may be configured as a built-in device in the control device 26 forming the medical observation device 2.

According to the above described embodiment, an illumination device according to the present disclosure is included in the medical observation device 2, but the illumination device is not limited to this embodiment. The illumination device 27 may be omitted from the medical observation device 2, and a shadowless lamp external to the medical observation device 2 may be formed as the illumination device according to the present disclosure. In that case, the medical image processing device 33 executes the shade and shadow processing based on the illumination condition information indicating conditions of illumination of an observation target OB by the shadowless lamp. Furthermore, the illumination device 27 and an external illumination device, such as a shadowless lamp, may be used together.

In the above described embodiment, color (illumination color) of illumination light from the illumination device 27 may be included in the illumination condition information.

According to the above described embodiment, the 3D modelling unit 332 that generates a CG image from plural tomographic images is included in a medical image processing device according to the present disclosure, but without being limited to this embodiment, the 3D modelling unit 332 may be provided in a device external to the medical image processing device. That is, the medical image processing device according to the present disclosure is not necessarily configured to generate a CG image, and may be configured to acquire the CG image from outside.

According to the above described embodiment, a head mounted display may be adopted as the display device 4.

The first to sixth axes O1 to O6 in the above described medical observation device 2 according to the embodiment are formed of passive axes, but are not limited to this embodiment. At least one of the first to sixth axes O1 to O6 may be formed of an active axis that allows the imaging unit 21 to rotate actively around that axis according to motive power of an actuator.

According to the above described embodiment, a flow representing the operation of the medical image processing device 33 is not limited to the flow illustrated in FIG. 5, and the order of the steps in the processing may be modified so long as no contradictions are caused by the modification.

A medical image processing device and a medical observation system according to the present disclosure enable generation of a superimposed image suitable for observation.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A medical image processing device comprising a processor comprising hardware, the processor being configured to:
   acquire a real image acquired by imaging of an observation target;
   execute cut-out processing of generating a cut-out image by cutting out at least a part of a three-dimensional image that is based on plural tomographic images having the observation target captured therein;
   execute shade and shadow processing of adding shade or a shadow to the cut-out image, based on illumination condition information indicating an illumination condition for the observation target in the imaging of the real image; and
   execute superimposition processing of generating a superimposed image by superimposing the cut-out image that has been subjected to the shade and shadow processing, on the real image.

2. The medical image processing device according to claim 1, wherein
   the illumination condition information is information including a position of an illumination device configured to illuminate the observation target in the imaging of the real image and an inclination of an illumination optical axis directed to the observation target from the illumination device, and
   the processor is configured to execute the shade and shadow processing of adding the shade or shadow to the cut-out image, based on the position of the illumination device and the inclination of the illumination optical axis.

3. The medical image processing device according to claim 2, wherein
   the illumination condition information includes light distribution characteristics in the illumination device, and
   t the processor is configured to adjust intensity of the shade or shadow in the shade and shadow processing, based on the light distribution characteristics.

4. The medical image processing device according to claim 2, wherein
the illumination condition information includes light quantity of illumination light emitted to the observation target from the illumination device in the imaging of the real image, and
the processor is configured to adjust intensity of the shade or shadow in the shade and shadow processing, based on the light quantity.

5. The medical image processing device according to claim 1, wherein
the processor is configured to execute the cut-out processing of generating the cut-out image by cutting out the at least part of the three-dimensional image, based on imaging condition information indicating an imaging condition for the observation target in the imaging of the real image, and
the imaging condition information includes at least one of: a position of an imaging device configured to image the observation target and output the real image; an inclination of an observation optical axis directed from the imaging device to the observation target; a focal distance in the imaging device; and an angle of view in the imaging device.

6. The medical image processing device according to claim 5, wherein the processor is configured to execute the cut-out processing of generating the cut-out image by:
recognizing, based on the imaging condition information, an imaging position by the imaging device on the observation target; and
cutting out a portion of the three-dimensional image, the portion being more separate from the imaging device than the imaging position is.

7. A medical observation system, comprising:
a medical observation device including an imaging device configured to image an observation target and output a real image;
a medical image processing device according to claim 1; and
a display configured to display a superimposed image generated by the medical image processing device.

* * * * *